Aug. 20, 1957 D. HOSKINS ET AL 2,803,180
CAMERA WITH AN ILLUMINATING ATTACHMENT
Filed June 21, 1955 2 Sheets-Sheet 1
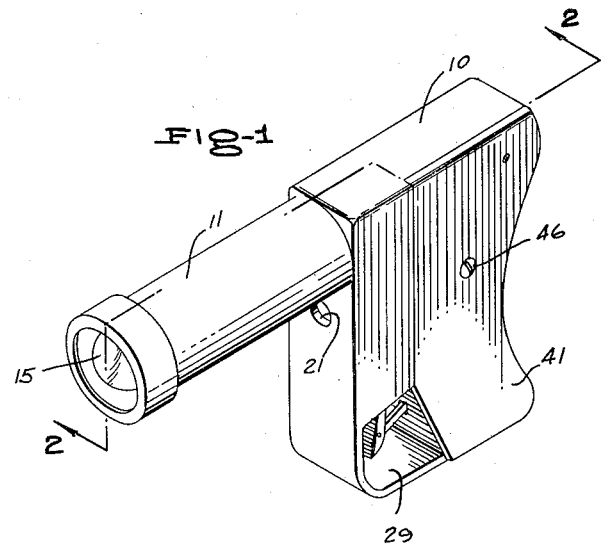
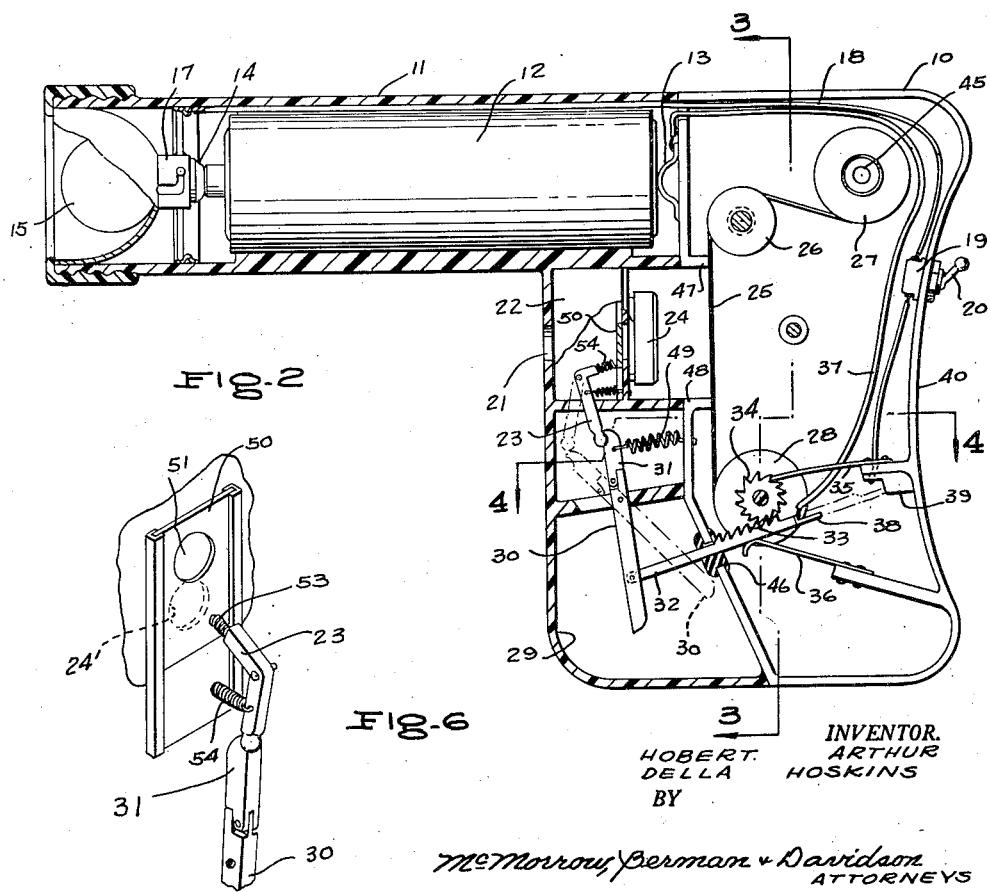
INVENTOR.
HOBERT ARTHUR
DELLA HOSKINS
BY
McMorrow, Berman & Davidson
ATTORNEYS Aug. 20, 1957 D. HOSKINS ET AL 2,803,180
CAMERA WITH AN ILLUMINATING ATTACHMENT
Filed June 21, 1955 2 Sheets-Sheet 2
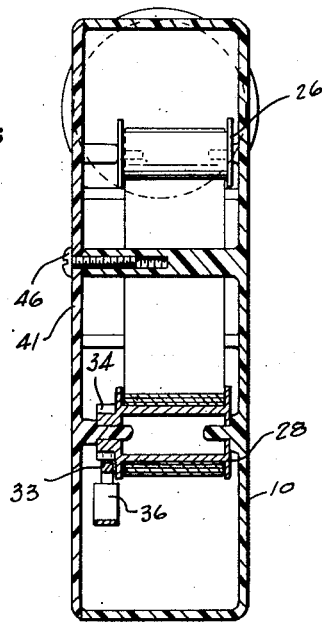
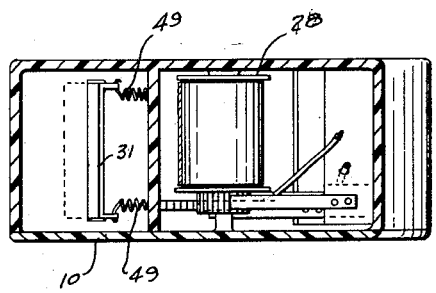
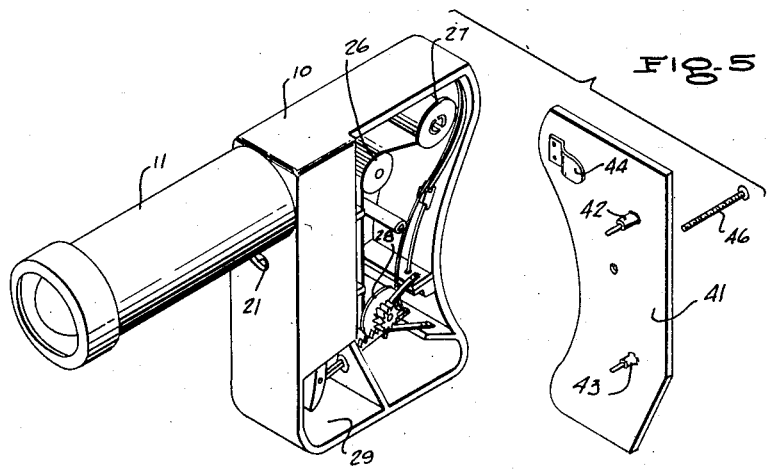
INVENTOR.
HOBERT ARTHUR
DELLA HOSKINS
BY
McMorrow, Berman + Davidson
ATTORNEYS 2,803,180
Patented Aug. 20, 1957

2,803,180

CAMERA WITH AN ILLUMINATING ATTACHMENT

Della Hoskins and Hobert Arthur, Newport, Ky.

Application June 21, 1955, Serial No. 516,926

3 Claims. (Cl. 95—34)

The present invention relates to cameras having synchronized illuminating attachment.

A primary object of the present invention is to provide a camera having means for projecting a spot of light at a distance from the camera and means for photographing the area illuminated by the spot of light simultaneously with the projection of the spot of light.

Another object of the present invention is to provide a small and compact pistol-type camera for use by police officers and the like and one which has means for repeated and automatic transporting of the film past the shutter opening together with self-cocking shutter release means.

A further object of the present invention is to provide a sturdily built and easily operated camera in the form of a pistol, and one in which the roll of film is easily insertable and connected to the film transport means.

These and other objects and advantages of the present invention will be fully apparent from the following description when taken in connection with the annexed drawings, in which:

Figure 1 is an isometric view of the camera assembled.

Figure 2 is a side view partially in cross section on the line 2—2 of Figure 1.

Figure 3 is a vertical end view on line 3—3 of Figure 2.

Figure 4 is a vertical view in cross section on line 4—4 of Figure 2.

Figure 5 is a view in perspective showing the cover of the camera casing removed.

Figure 6 is a diagrammatic view of the shutter mechanism of the present invention.

Referring in greater detail to the drawings in which like numerals designate like parts throughout the several views, the present invention consists of an upstanding casing 10 having a horizontally disposed tube 11 projecting outwardly adjacent the upper end of the casing 10 from the front face of the casing.

A battery 12 is positioned within the tube 11 and has one end in contact with an electrical contact 13 and with the other end in contact with the base contact 14 of an electric bulb 15, the side contact 16 of the bulb being in electrical connection with the socket 17 and a wire 18 extending to the rear inner wall of the casing 10 to where it is connected to one side of a switch 19 having its handle 20 projecting rearwardly from the rear wall of the casing 10.

The casing 10 is provided with an exposure aperture indicated by the reference numeral 21 in the front face of the casing, the aperture 21 being in register with a shutter mechanism or means 22 having a shutter release lever 23 projecting from the lower end. A lens 24 is provided for concentrating the light entering the aperture 21 on a film strip 25 which is carried by an intermediate roller 26 from the supply roll 27 to the windup roll 28.

The casing is provided at its lower end adjacent to its front face with a finger-opening 29 extending from one side wall to the other and in which is disposed the lower end of a trigger 30 connected to the casing 10 for limited swinging movement. As the upper end of the trigger 31 reaches or approaches the limit of its swinging movement toward the lever 23 it engages the end of the lever 23 to actuate the shutter release means in the shutter mechanism 22.

Intermediate of the ends of the trigger 30 is pivotally connected one end of a bar 32 having upstanding rack gear teeth 33 intermediate of its ends which are engageably in mesh with the teeth of a ratchet gear 34 operatively connected to one end of the windup roll 28. A dog 35 prevents the reverse operation of the ratchet gear 34 and a spring arm 36 biases the bar 32 upwardly but permits it to have a ratchet action upon its return to the full line position shown in Figure 2.

A wire 37 connects the electrical contact 13 with a contact 38 secured to the end of the bar 32 remote from its point of connection to the trigger 30. Another contact 39 is positioned on the inner face of the rear wall 40 of the casing 10 and is engaged by the contact 38 whenever the trigger 30 has been swung to the limit of its swingable movement and simultaneously with the actuation of the shutter release means by the lever 23.

As seen in Figure 5 the casing 10 has a removable side panel 41, from the inner face of which project the roller pins 42 and 43 for supporting when in the closed condition the free ends of the roller 26 and the windup roll 28, respectively. A spring clip 44 projects by its free end from the inner face of the panel 41 to bear against the free end of the supply roll 27. In use, the supply roll 27 is inserted within the casing 10 to its place of support upon a pin 45 seen in end view in Figure 2.

The film strip 25 is then unreeled with its protective paper coating over the intermediate roller 26 and to its engagement with the windup roll 28. A rubber grommet 46 permits the sliding movement of the bar 32 and makes the interior of the casing 10 light-tight when the panel 41 has been returned to its closed position and secured by means of the screw 46.

It will be seen that when the trigger is moved to its position shown at 30' in Figure 2, the rack gear teeth 33 will have turned the ratchet gear 34 and will have transported the film past the ends of the interior walls 47 and 48 within the casing which maintain the strip of film at a spaced distance from the lens 24.

Upon reaching the end of its swinging movement the lever 23 which is of the self-cocked type will actuate the shutter release mechanism simultaneously with the abutting of the contacts 38 and 39 together to complete the circuit and energizing the bulb 15.

It is a purpose of the present invention that the bulb 15 may be a flash type of bulb or may be a spotlight bulb, whichever is desirable.

For daylight operation, the switch 13 is used to disconnect the battery 12. A pair of springs 49 return the trigger to its other and first position.

The shutter mechanism 22 is shown in detail in Figure 6 and consists of a shutter 50, having a hole 51, and slidably movable from a position bridging the exposure aperture 21 and the lens 24 to a non-bridging position. The upper end of the trigger is provided with a trip arm 31 which engages one arm of the shutter release lever 23 and carries the lever 23 with it to the limit of movement of the trigger 30, as seen in dotted lines in Figure 2, when the over-center action of the spring 53 and the other arm of the lever 23 snaps the shutter 50 downwardly to expose the portion of the web of film 25 extending across and spaced from the face of the lens 24 remote from the shutter. A spring 54 returns the lever and shutter to the bridging position.

What is claimed is:

1. A camera comprising an upstanding casing, a horizontally disposed tube projecting outwardly from the front face of said casing adjacent the upper end thereof and having one end secured to said casing, an electric storage battery carried in said tube, illumination means carried in said tube adjacent the other end thereof and being in circuit with said battery, said casing being formed with an opening in its front face spaced from said tube for exposing a portion of a film, a lens positioned in said casing and spaced from said opening, a shutter interposed between said opening and said lens and normally bridging said opening and connected to said casing for movement from the bridging position to a position out of bridging relation with respect to said opening, a first rotatable roller positioned within said casing, a second rotatable roller positioned within said casing and arranged in spaced parallel relation with respect to said first roller, a web of film positioned within said casing so that an intermediate portion extends across and spaced from the face of said lens remote from said shutter and having one end portion wound on said first roller and having the other end portion wound on said second roller, a ratchet operatively connected to said second roller for rotating the latter step by step and simultaneously moving the corresponding portion of said film web into registry with said lens, actuating means operatively connected to said shutter, a contact element carried by said casing and connected in circuit with said battery, a bar mounted in said casing for backwardly and forwardly movements and having teeth on its intermediate portion in meshing engagement with said ratchet and having one end engageable with said contact upon execution of the limit of the backwardly movement of said bar, and a trigger supported in said casing intermediate its ends for rocking movement about an axis transverse of said casing and having one end pivotally connected to the other end of said bar and having the other end simultaneously engageable with said shutter actuating means upon execution of the limit of the backwardly movement of said bar.

2. A camera comprising an upstanding casing, a horizontally disposed tube projecting outwardly from the front face of said casing adjacent the upper end thereof and having one end secured to said casing, an electric storage battery carried in said tube, illumination means carried in said tube adjacent the other end thereof and being in circuit with said battery, said casing being formed with an opening in its front face spaced from said tube for exposing a portion of a film, a lens positioned in said casing and spaced from said opening, a shutter interposed between said opening and said lens and normally bridging said opening and connected to said casing for movement from the bridging position to a position out of bridging relation with respect to said opening, a first rotatable roller positioned within said casing, a second rotatable roller positioned within said casing and arranged in spaced parallel relation with respect to said first roller, a web of film positioned within said casing so that an intermediate portion extends across and spaced from the face of said lens remote from said shutter and having one end portion wound on said first roller and having the other end portion wound on said second roller, a ratchet operatively connected to said second roller for rotating the latter step by step and simultaneously moving the corresponding portion of said film web into registry with said lens, actuating means operatively connected to said shutter, a contact element carried by said casing and connected in circuit with said battery, a bar mounted in said casing for backwardly and forwardly movements and having teeth on its intermediate portion in meshing engagement with said ratchet and having one end engageable with said contact upon execution of the limit of the backwardly movement of said bar, and a trigger supported in said casing intermediate its ends for rocking movement about an axis transverse of said casing and having one end pivotally connected to the other end of said bar and having the other end simultaneously engageable with said shutter actuating means upon execution of the limit of the backwardly movement of said bar, said shutter actuating means embodying a lever pivotally mounted in said casing and having one arm engageable with the upper end of said trigger and with the other arm resiliently connected to said shutter for movement of the latter to non-bridging position with over center action upon engagement of said one arm with said upper end of said trigger.

3. A camera comprising an upstanding casing, a horizontally disposed tube projecting outwardly from the front face of said casing adjacent the upper end thereof and having one end secured to said casing, an electric storage battery carried in said tube, illumination means carried in said tube adjacent the other end thereof and being in circuit with said battery, said casing being formed with an opening in its front face spaced from said tube for exposing a portion of a film, a lens positioned in said casing and spaced from said opening, a shutter interposed between said opening and said lens and normally bridging said opening and connected to said casing for movement from the bridging position to a position out of bridging relation with respect to said opening, a first rotatable roller positioned within said casing, a second rotatable roller positioned within said casing and arranged in spaced parallel relation with respect to said first roller, a web of film positioned within said casing so that an intermediate portion extends across and spaced from the face of said lens remote from said shutter and having one end portion wound on said first roller and having the other end portion wound on said second roller, a ratchet operatively connected to said second roller for rotating the latter step by step and simultaneously moving the corresponding portion of said film web into registry with said lens, actuating means operatively connected to said shutter, a contact element carried by said casing and connected in circuit with said battery, a bar mounted in said casing for backwardly and forward movements and having teeth on its intermediate portion in meshing engagement with said ratchet and having one end engageable with said contact upon execution of the limit of the backwardly movement of said bar, and a trigger supported in said casing intermediate its ends for rocking movement about an axis transverse of said casing and having one end pivotally connected to the other end of said bar and having the other end simultaneously engageable with said shutter actuating means upon execution of the limit of the backwardly movement of said bar, said shutter actuating means embodying a lever pivotally mounted in said casing and having one arm engageable with the upper end of said trigger and with the other arm resiliently connected to said shutter for movement of the latter to the non-bridging position with over center action upon engagement of said one arm with said upper end of said trigger, said upper end of said trigger embodying a trip arm engageable with said one arm of said lever in the one direction of backward movement of said trigger.

References Cited in the file of this patent

UNITED STATES PATENTS

| 1,272,635 | De Marco | July 16, 1918 |
| 1,470,708 | Blum | Oct. 16, 1923 |
| 1,690,292 | Grosso | Nov. 6, 1928 |
| 1,699,906 | Murray | Jan. 22, 1929 |

FOREIGN PATENTS

| 6,353 | Great Britain | Apr. 13, 1889 |